United States Patent
Repp et al.

[11] Patent Number: 5,967,352
[45] Date of Patent: Oct. 19, 1999

[54] INTERRUPTED THREAD CAP STRUCTURE

[75] Inventors: Richard E. Repp, San Jose; Laszlo G. Sandor, Fremont; Jack L. Watts, Menlo Park, all of Calif.

[73] Assignee: Portola Packaging, Inc., San Jose, Calif.

[21] Appl. No.: 08/939,257

[22] Filed: Sep. 29, 1997

Related U.S. Application Data

[63] Continuation-in-part of application No. 08/828,395, Mar. 28, 1997.

[51] Int. Cl.$^6$ .............................. B65D 39/00; B65D 41/34
[52] U.S. Cl. .......................... 215/256; 215/329; 215/232; 220/296
[58] Field of Search .................................... 215/256, 252, 215/329, 330, 318, 320, 232; 220/296

[56] References Cited

U.S. PATENT DOCUMENTS

| | | |
|---|---|---|
| 1,866,770 | 7/1932 | Hilgenberg . |
| 3,840,143 | 10/1974 | Davis et al. . |
| 4,643,330 | 2/1987 | Kennedy . |
| 4,721,220 | 1/1988 | Northup ............................... 215/329 X |
| 4,872,571 | 10/1989 | Crecelius et al. . |
| 4,948,001 | 8/1990 | Magly . |
| 5,190,178 | 3/1993 | Luch ................................... 220/296 X |
| 5,197,621 | 3/1993 | Bratl et al. ........................... 220/296 X |
| 5,307,945 | 5/1994 | Hidding et al. . |
| 5,415,306 | 5/1995 | Luch et al. . |
| 5,431,291 | 7/1995 | LaBombarbe, Jr. ................. 215/329 X |
| 5,533,633 | 7/1996 | King ................................... 220/296 X |
| 5,542,556 | 8/1996 | Ohmi et al. .............................. 215/329 |
| 5,642,825 | 7/1997 | Wohlgemuth ........................... 215/256 |
| 5,664,694 | 9/1997 | Bietzer et al. . |
| 5,775,528 | 7/1998 | Wohlgemuth et al. .................. 215/256 |

*Primary Examiner*—Stephen K. Cronin
*Assistant Examiner*—Nathan Newhouse
*Attorney, Agent, or Firm*—Julian Caplan; Flehr Hohbach Test; Albritton & Herbert LLP

[57] ABSTRACT

A container neck is used with a tamper-evident, snap-on, screw-off closure. The neck has a multiple of four first helical threads on a neck stretch portion, and at least one external ratchet tooth on a locking wall portion below the neck stretch. The closure has an upper skirt having second helical threads mating with the first helical thread of the neck and a lower skirt with at least one internal ratchet tooth shaped and positioned to engage the external ratchet tooth when the closure is applied to the neck. The teeth formed on the skirt interior and neck exterior are arranged to provide at least one circumferentially extending stretch of the tamper-evident band where the teeth are not engaged. A line of weakness extending vertically through the disengaged stretch of the tamper-evident band is ruptured when the closure is unscrewed from the neck. The number of helical threads is preferably eight and, in any event, a multiple of four. In one modification the threads are interrupted and the gaps between thread segments are vertically aligned while in another modification the thread segments are staggered. In still another modification there is a space where vertically aligned segments are omitted to provide space for the down-turned tab of a foil disc sealing the lip on the container. Where the container is made of PET or other accurately molded substance the points of the neck ratchet teeth are rounded to avoid injury to the user.

6 Claims, 8 Drawing Sheets

FIG. 16

INTERRUPTED THREAD CAP STRUCTURE

CROSS REFERENCE TO RELATED APPLICATION

This application is a continuation-in-part of co-pending application Ser. No. 08/828,395 filed Mar. 28, 1997 entitled Container Neck Having Eight-Thread Configuration.

BACKGROUND OF THE INVENTION

1. Field of the Invention

The present invention relates in general to a tamper-evident container closure and container neck structure in which the closure is applied to the neck with an axial downward force. The closure is removed by unscrewing it from the neck. The tamper-evident skirt of the closure ruptures when the closure is initially removed from the container neck. The absence of the tamper-evident skirt provides visible evidence that the container has been opened and the contents of the container possibly tampered with by a dishonest patron.

The present invention further relates to a closure thread structure in which the threads are interrupted, in one modification having a vertical gap between adjacent ends of thread segments and in another modification having staggered thread segments and staggered gaps between segments. In a still further modification there is a vertical space between thread segments which accommodates a foil seal tear tab. The present invention further relates to a PET neck structure wherein the edges of the ratchet teeth are rounded.

2. Description of the Prior Art

The fewer the number of threads on a container neck, the easier is axial application—i.e., downward application of force on the cap which fits on the neck. However, fine threads require increased aggregate linear thread engagement for security, since the radial thread engagement achieved is reduced. Excessive aggregate linear thread engagement on threads having few leads requires excessive turning to remove and re-apply the cap. Therefore, a combination of fine threads having many leads has been taught in the art. Angelo Guala SpA UK Pat. Application GB 2144553 and Massmould Holdings, Ltd. European Patent Specification 0 118 267 each show six leads. U.S. Pat. Nos. 5,307,946 and 5,560,504, show seven threads. U.S. Pat. No. 5,553,727 discloses ten threads.

U.S. Pat. No. 5,593,055 discloses many features of construction of the container neck and cap hereinafter described. This reference discloses seven leads.

U.S. Pat. No. 5,480,045 illustrates a form of horizontal tear tab used in one modification of this invention.

U.S. Pat. No. 5,664,694 illustrates a vertical space formed by interrupting cap skirt threads to accommodate the tab used to remove foil disks sealing container neck lips.

SUMMARY OF THE INVENTION

The present invention provides an improved novel neck finish for a container such as a blow molded plastic bottle on which a multiple spiral thread pattern configuration of spiral threads arranged in vertical and circumferentially spaced relation to one another together with a thin wall plastic cap that may be pushed onto the container, the cap having a top and a depending annular wall with multiple annular spiral thread patterns circumferentially and vertically spaced formed on the inner surface of said depending wall of the cap. The combination of the improved cap and neck finish of the container result in a rapid and positive engagement of the multiple continuous spiral thread patterns on the respective neck finish with those on the inner surface of the depending wall of the cap.

The present invention further comprises an improved closure or cap and neck finish. The cap skirt and neck are provided with mating threads of such shape that the cap may be applied in a simple downward vertical movement, the cap skirt flexing sufficiently to permit the threads to slip past each other. The interengagement of the threads requires that the closure be unscrewed for removal from the container.

The cap has a tamper-evident tear band frangibly attached to the cap skirt by a plurality of bridges or by a line of weakness. A plurality of ratchet teeth extend circumferentially around the interior of the tamper-evident band. The neck finish also includes multiple ratchet teeth below the threads on the neck. In one modification of the invention the teeth are localized, with the groups of teeth separated by gaps or interrupted stretches. The teeth on the cap interior cooperatively engage the teeth on the neck exterior to prevent removal of the cap so long as the tamper-evident band is intact. The tamper-evident band may be torn from the cap skirt and the cap easily unscrewed from the neck. Alternatively, the cap may be unscrewed, fracturing the bridges or line of weakness and separating the tamper-evident band from the cap skirt, to initially open the container.

A novel neck finish on a container such as a blow molded plastic bottle comprises multiple continuous spiral thread patterns presenting multiple lead-in thread configurations adjacent the top of the blow molded container and its neck finish. The lead-in points are circumferentially spaced with respect to one another and each point comprises the upper lead-in end of a continuous spiral thread formed on the neck finish. The present invention employs a thread pattern in which the number of thread leads is eight. For a rectangular cross-section bottle, the neck quadrant corresponding to each side of the bottle has two thread leads positioned vertically and circumferentially identical to those of the other three quadrants. The matching cap has registering multiple thread patterns spaced vertically and horizontally so that the spiral threads on the neck finish of the container will readily and quickly engage multiple circumferentially spaced spiral thread patterns extending around the depending annular wall of the cap. Substantially improved application of the caps to the neck finishes of the containers is achieved as well as very substantially increased liquid sealing engagement between the multiple continuous spiral thread patterns on the container neck finish and on the inner surface of the depending wall of the improved cap.

The container which is preferably used in carrying out the present invention is a bottle having four sides at its lower end and having a round neck at its upper end. The neck of the bottle is threaded and the number of thread starts on the neck is eight. Accordingly when viewing the bottle perpendicular to any of the four panels of the container, the threads appear the same. It is often possible to orientate the cap and bottle, using the rectangular shape of the bottle. The bottle neck having eight leads permits precise thread registration regardless of which of the four panels is used for orientation purposes.

In one form of the invention, the cap is formed with screw threads which are interrupted in that there are segments to each thread lead separated from adjacent segments by gaps. In one form of this invention, the gaps are vertically aligned while in another form of the invention the gaps are staggered so that the tooth segments overlap. Interrupted threads permit thinner cap skirt walls in that the walls are less likely to collapsed when the cap is applied to a neck with a downward snap-on motion.

Some container necks are sealed with foil seals adhered to the lip of the container, as well understood in this art, and such seals usually have a tab projecting from a portion the edge which may be gripped to remove the seal. It is desirable that the tab be bent down and interposed between the container neck and closure skirt. The space between the adjacent sets of thread segments provides space for the foil tab.

The container neck may be of several different constructions. In one of the modifications described herein the container is blow molded or similarly fabricated and its dimensions are subject to dimensional inaccuracy. In still another modification of the invention, the container is formed of PET and fabricated by an injection apparatus and has very precise dimensions. The ratchet teeth on the container neck which engage corresponding ratchet teeth on the closure tend to terminate in sharp points which may injure the user. In accordance with the invention the neck ratchet teeth are rounded both when viewed in a side elevation and in a plan view. Such rounding of the points reduces the danger to users.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Referring first to the disclosure of FIGS. 1–8:

Closure 21, hereinafter described in detail, is used with a container neck 22. The closure 21 and the neck 22 are subject to some variation, but preferably are formed for initial direct, axial application of the closure to the container. The interior of the neck 22 forms no part of the present invention. With an extruded blow-molded bottle finish, the interior contour of the neck tends to follow that of the neck exterior. However, it will be understood that other types of bottles may be used, with the internal shape of the neck varying from that of the exterior.

Figure 1:
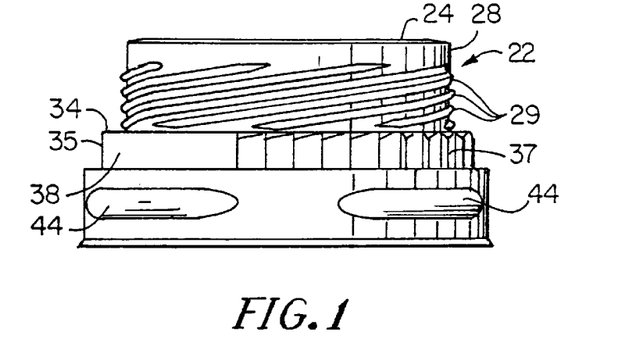
FIG. 1 is a side elevational view of a container neck embodying one form of the invention wherein there are eight thread starts or lead-ins.

Neck 22 has a central opening 23, a lip 24 surrounding the opening 23 and a vertical stretch 28 depending from the lip. In the embodiment shown, lip 24 comprises an upward-inward slanted flange. It should be understood that the term "lip" used herein refers to the edge of the neck around the opening, which may be in the form of an annular rim, a flange, or any other shape known in the art. Helical threads 29 extend outward of stretch 28. The shape of the threads 29 permits the threads on the interior of the cap to slip past and interengage the threads 29 of the neck.

Figure 2:
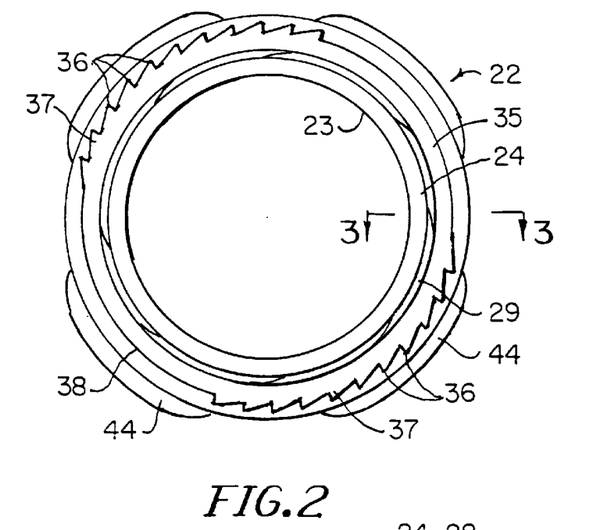
FIG. 2 is a top plan view of the structure of FIG. 1.
Figure 3:
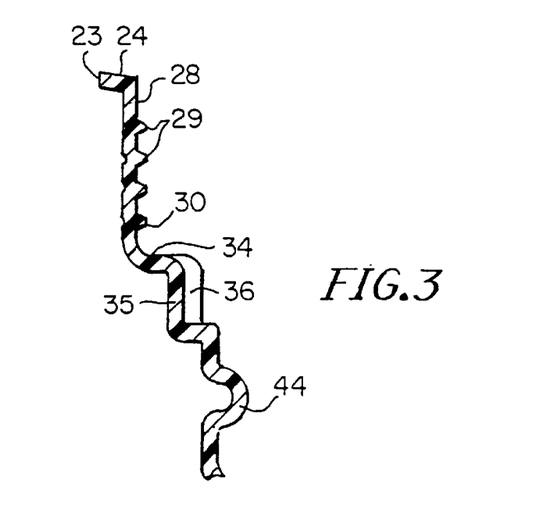
FIG. 3 is an enlarged fragmentary sectional view taken substantially along the line 3—3 of FIG. 2.

As shown in FIGS. 1–3, there are eight thread starts. Considering the structure shown in FIG. 2 it will be seen that there are two threads in each of the four quadrants of the neck. It will also be understood that in some instances there may be twelve leads. However, any number of leads in excess of twelve is likely not practical for a neck diameter of approximately 38 mm. Since the number of threads is preferably a multiple of four, the result is that, viewed in any of the four quadrants of the container, there is the same number of thread starts. Where the cap applied to the neck has been oriented, precise thread engagement is automatically ensured when the bottle is presented in any of four different ways. The use of this structure eliminates "float" in the height of the cap after it has been axially seated on the bottle in that it is fully seated.

The vertical stretch 28 terminates in an outward extending shoulder 34. A locking wall portion 35 below the vertical stretch 28 has a plurality of external ratchet teeth 36 projecting from the locking wall. The ratchet teeth 36 are shaped to interengage the internal ratchet teeth formed on the cap, preventing twisting of the cap relative to the neck. As shown particularly in FIG. 2, the neck finish has two diametrically opposed groups 37 of eleven teeth each which are separated by diametrically opposed interrupted stretches 38 which extend approximately 90° of the circumference of the locking wall portion. The interruptions eliminate undercuts in the ratchet configuration when forming the neck in a two split mold, as is the practice. However, it is to be understood that the number and arrangement of ratchet teeth 36 and interrupted portions 38 may vary. The teeth 36 and interrupted stretch 38 provide tamper-evidencing means which, together with the tamper-evidencing means of the cap, ensure there is visible evidence of the initial opening of the container.

The locking wall 35 terminates in a horizontal shoulder beneath which is a vertical stretch 43 formed with a plurality of outward bulges 44 which perform the function of a "bumper ring" to facilitate gripping the container during the filling and loading process. The lower edge of the stretch 43 merges with the container.

A cap 21 for use with neck structure 22 is illustrated in FIGS. 4–8. The cap has a top 52 from the periphery of which depends a downward extending upper skirt 53. The top as illustrated comprises a generally flat top disk; however, other configurations such as a dome shape or dispensing feature may be substituted. The exterior of upper skirt portion 53 has spaced vertical ribs 54 to enable the user to grip and then unscrew the cap.

Helical engagement means, such as threads 56, are formed on the interior of the skirt 53. The threads are selected to mate with threads 29 of neck 22, with the shape of threads 29 and 56 allowing the threads to slip past one another on axial application and then interengage. The helical engagement means may be provided by continuous threads as shown, interrupted threads or other engagement means. Threads 56 are multilead, here shown eight in number, with each thread extending approximately 170° around the circumference of the cap. The cap tends to rest horizontally on neck 22 when deposited on the neck by conventional capping machines since the leads of threads 56 are evenly distributed around the circumference of the cap, facilitating the application of the cap onto the neck with a downward axial force. The linear density of the threads 56 in the embodiment illustrated in FIGS. 4–8 is approximately sixteen threads per vertical linear inch. However, it is to be understood that the length of the threads and thread density may be subject to considerable variation.

In order for the closure and container threads to effectively slip past each other during direct axial application, the threads must be finer than those of a threaded closure applied by conventional rotary application. As threads become finer, a greater amount of total linear thread engagement is often necessary for retention security and to prevent excessive forward stripping on reapplication. This is because the radial contact between threads is decreased. A total aggregate thread engagement of approximately 1000° is satisfactory for the embodiment illustrated in FIGS. 4–8 where the multilead threads 56 are formed with a thread density of sixteen threads per inch, although it is to be understood that the total thread engagement may be increased or decreased as desired.

Figure 7:
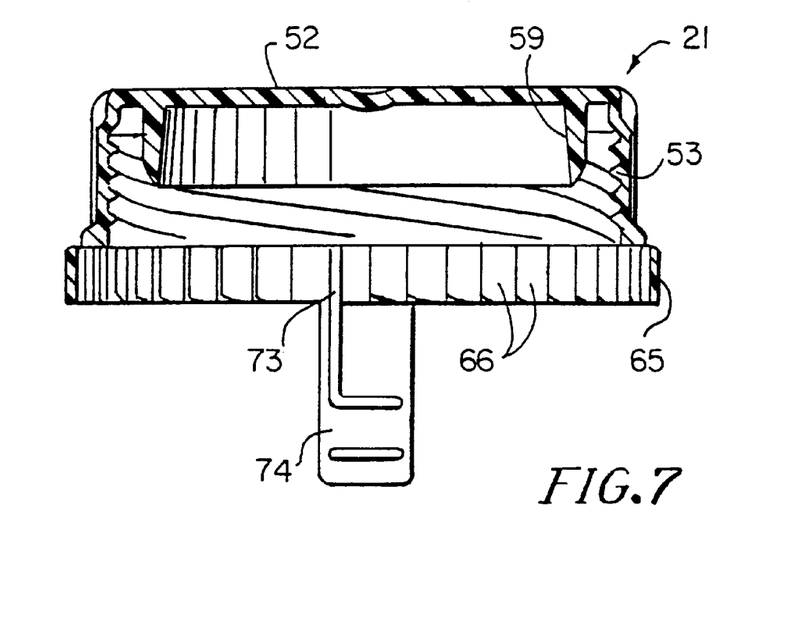
FIG. 7 is a vertical midsection through the structure of FIG. 4.

An inward extending portion 57 projects inward from the interior of the upper skirt 53 below the underside of the top 52 to define the minimum interior circumference of the cap. Preferably, the minimum interior circumference of the cap is less than the exterior circumference of the neck stretch 28 to form a tight fit between the upper skirt 53 and the neck stretch 28. When the cap is applied, the inward extending portion 57 contacts the upper edge of the neck stretch 28 and biases the upper edge 58 of the upper skirt outward, stretching the top 52 of the cap and forming a tight fit between the upper skirt 53 and the neck stretch 28. The inward extending portion is shown as a shoulder, but it will be understood that it could be replaced by a circumferentially extending bead projecting inwardly from the cap wall.

A plug or inner skirt 59 depends from the underside of the top 52. The plug 59 is spaced inward of the upper skirt 53 to fit inside the neck opening 23. The outer bottom edge of the plug 59 is preferably formed with a bevel 60 to facilitate seating of the cap 21 on the neck. The plug 59 is pulled against the interior edge of the lip 24 as the cap 21 seats on the neck and the neck stretch 28 biases the upper edge 58 of the outer skirt outward. With a blow molded finish, neck opening 23 is formed using a blow pin which provides the interior edge of the lip 24 with a seamless surface. Since the exterior edge of the plug is also seamless, pulling the plug against the interior edge of the lip forms a substantially liquid impervious seal between the cap 21 and the neck 22.

The cooperation between inward extending portion 57, the plug 59 and the interior edge of lip 24 provides the closure system with a substantially leak-tight seal. The seal between the plug exterior and the lip is of particular interest when the neck has a blow molded finish and the cap is not lined with an additional sealing material. However, it should be understood that various other sealing means may be used to seal the container.

A lower skirt or tamper-evident band 65 below the upper skirt 53 has a plurality of internal ratchet teeth 66 projecting inward from the interior of the lower skirt 65. The lower skirt is attached to the lower edge of the upper skirt by frangible connections or bridges 67 extending between the upper skirt and the upper edge 68 of the teeth 66. Depending upon the strength and number of frangible bridges 67 incorporated in the cap, the bridges may prevent removal of the cap without separating the lower skirt 67 from the upper skirt 53, or the bridges may rupture when a consumer attempts to initially remove the closure 21 from the neck 22.

The teeth 66 on the interior of the lower skirt 65 are shaped and positioned to engage teeth 36 on locking wall portion 35 when the cap 21 is seated on the neck. The interengagement between the teeth 36 and 66 prevents removal of the cap 21 so long as the tamper-evident band is intact. In the embodiment illustrated in FIGS. 4–8, the entire circumference of the band 65 is formed with teeth 66. It is to be understood that in other modifications of the invention the interior of the lower skirt may have one or more interrupted stretches without teeth 66.

Figure 4:
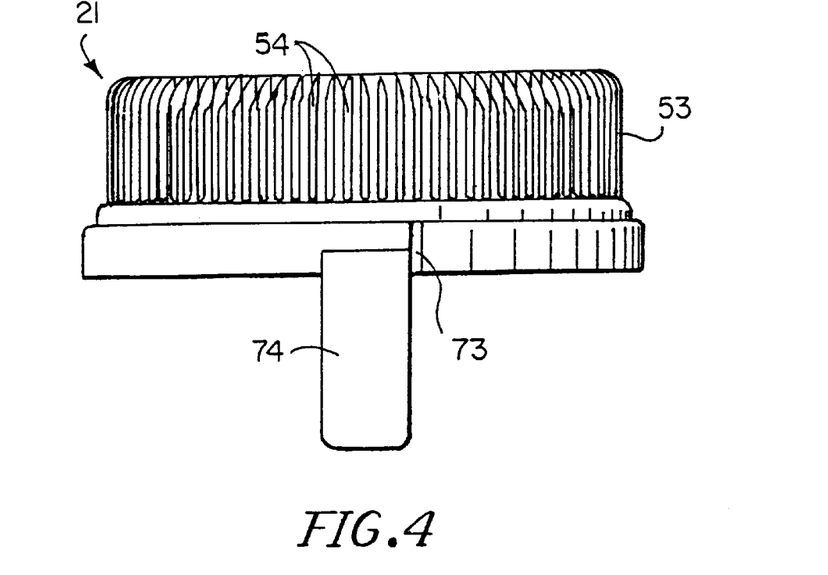
FIG. 4 is a side elevational view of a cap used on the neck of FIG. 1.
Figure 5:
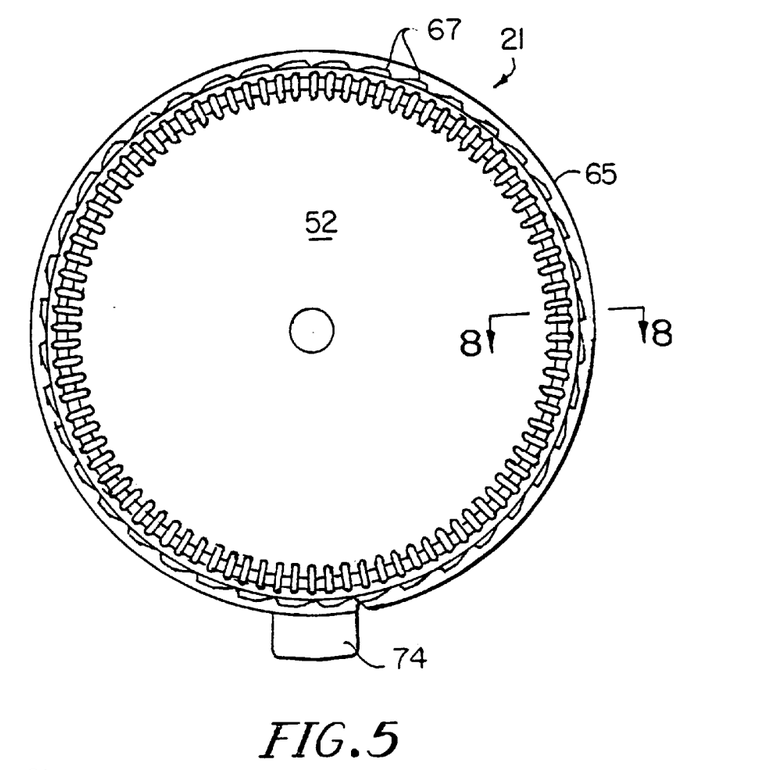
FIG. 5 is a top plan view of the structure of FIG. 4.
Figure 6:
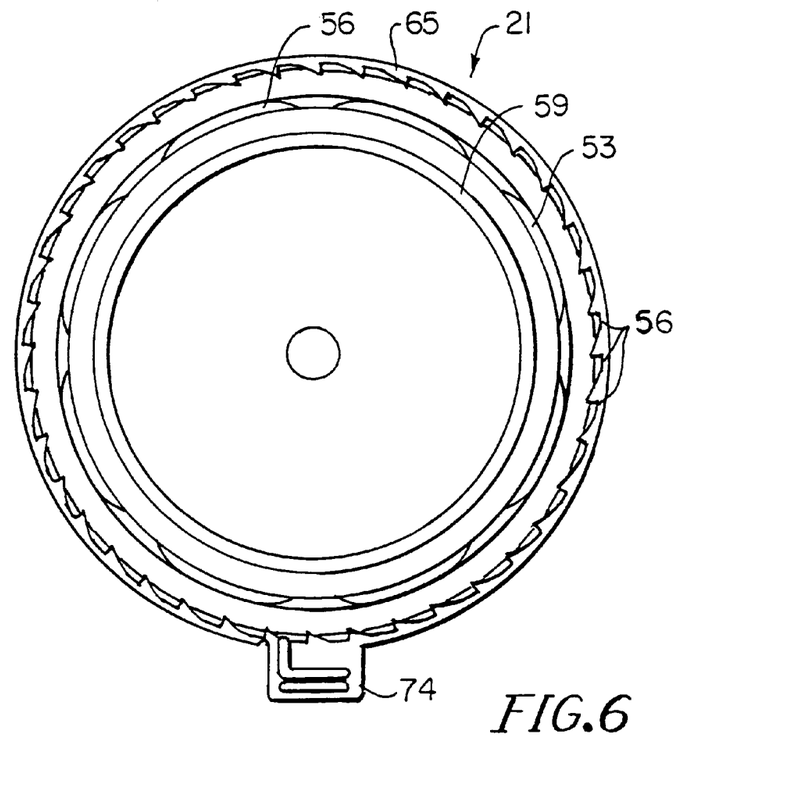
FIG. 6 is a bottom plan view thereof.

The lower skirt 65 is removed from cap 21 before the cap is twisted open. The lower skirt 65 preferably has a vertically extending line of weakness 73 which ruptures when the container is initially opened, splitting the lower skirt to provide a visible indication that the container has been opened. The weakened line 73 may be provided by a continuous thin tear line extending through the lower skirt, as shown in FIG. 4, or the weakened line 73 may alternatively be formed using other frangible means known in the art. In addition to protecting the consumer from a dishonest patron, the line of weakness facilitates separation of the lower skirt from the upper skirt and eliminates the dangers an intact band may present to wildlife. A tear tab 74 extends downwardly from the lower edge of the tamper-evident band 65 in the vicinity of weakened line 73. The tear tab provides means for removing the lower skirt and may also be used to orient cap 21 relative to the container prior to application. The consumer may grasp the tear tab 74 and pull the band 65 from the container, rupturing the weakened line 73 and circumferentially fracturing bridges 67. Once the lower skirt is removed, the consumer may unscrew the cap 21 from the neck 22. Alternatively, the lower skirt 65 may be removed from the cap 21 before the cap is twisted open.

Preferred Operation

After the container has been filled, it is transported through a capping machine. The structure of capping machines is well known in the bottling art. As is well understood in the art, and in a manner similar to that whereby push-on, pull-off caps are applied, caps 21 are fed one at a time out of a bowl in the capping machine along a chute preferably formed with a space between parallel rails, with tear tab 74 orienting the caps for uniform discharge in a pre-determined orientation relative to the containers passing therebelow by fitting into the space between the rails. A rectangular container permits neck thread orientation. The container travels along a conveyer belt below the capping machine. Guide rails adjacent the conveyor belt directionally align the rectangular cross section of the container relative to the tear tab 74 of the cap. Thus, in this present embodiment, the cap 21 and neck 22 may be conveniently oriented relative to one another by the conventional capping machine and conveyor belt system. Threads 29 and 56 are in vertical registration, ensuring full thread engagement.

An axially downward force is applied to the cap, pushing the cap onto the neck. Threads 56 slip over threads 29, the slanted surfaces of the neck threads facilitating such movement. The cap is sufficiently resilient so that it expands outward to permit the threads to slip. Teeth 66 fall behind and engage teeth 36 as the cap seats on the neck. The cap is fully sealed on the neck with precise registration. After the cap has been fully seated on neck 22, it may not be removed without providing evidence of tampering. The interengagement between teeth 36 and 66 prevent unscrewing of the cap from the container, while the interengagement between the threads prevents the lifting of cap 21 off neck 22.

Figures 8, 9A:
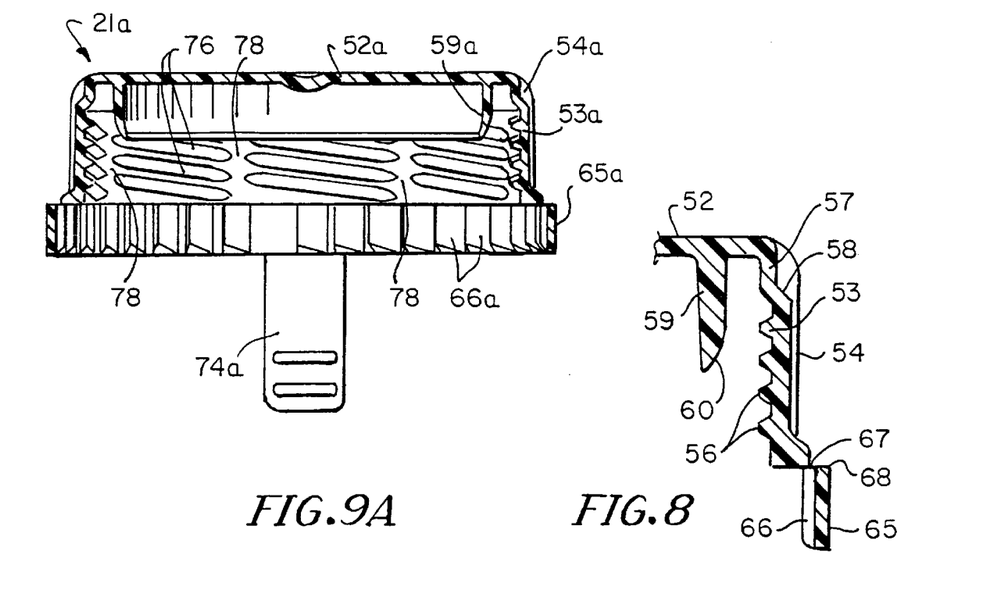
FIG. 8 is an enlarged fragmentary sectional view taken substantially along the line 8—8 of FIG. 5.
FIG. 9A is a view similar to FIG. 7 of the structure of FIG. 9.
Figure 9:
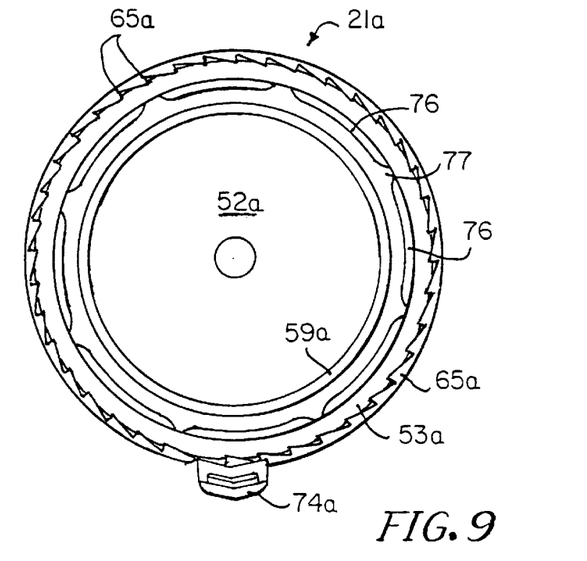
FIG. 9 is a view similar to FIG. 6 of a modified cap.
Figure 10:
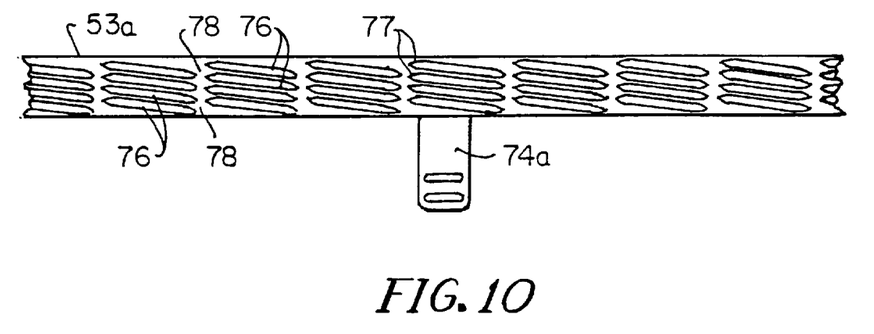
FIG. 10 is a flat development in a plane of the structure of the threads of the modification of FIGS. 9 and 9A.

Referring now to the modification of the invention shown in FIGS. 9–10:

The cap thread 53 shown in the previous modification may be interrupted to permit use of thinner skirt walls without increasing the likelihood of the skirt collapsing during the capping operation. As shown in FIGS. 9, 9A and 10, a preferred thread is an 8 thread configuration with each of the 8 lead threads comprising four segments 76 interrupted by gaps 78. There are rounded and tapered ends 77 at each end of each segment 76 so that thread engagement commences at about 10° from the leading end of each segment 76 and terminates at about 10° before the trailing end of each segment. There is, therefore, approximately 165° of effective full thread depth. Each segment 76 comprises 30° of full thread depth. In a preferred construction there are 16 threads per inch. However, it will be understood that other thread constructions may be use. As seen in FIG. 9A and FIG. 10, the gaps 78 between thread segments 76 are vertically aligned.

Figure 11:
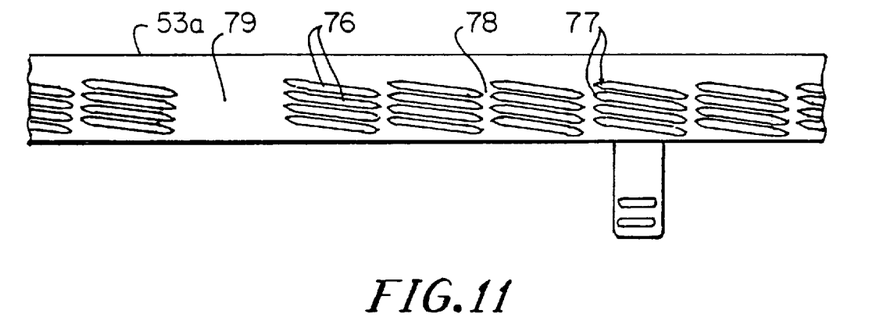
FIG. 11 is an enlarged modification of FIG. 10.

In the modification of FIG. 11, there is a vertical space 79. This space is advantageous where a foil seal is applied to the end of the container neck and the seal has a tab (used in removing the seal) which depends between the neck and the cap skirt 53a as is described in U.S. Pat. No. 5,664,694.

Figure 12:
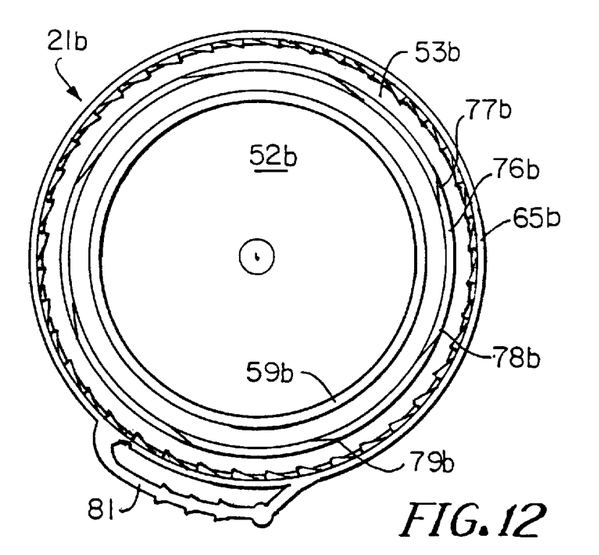
FIG. 12 is a view similar to FIG. 6 of a further modification.
Figure 12A:
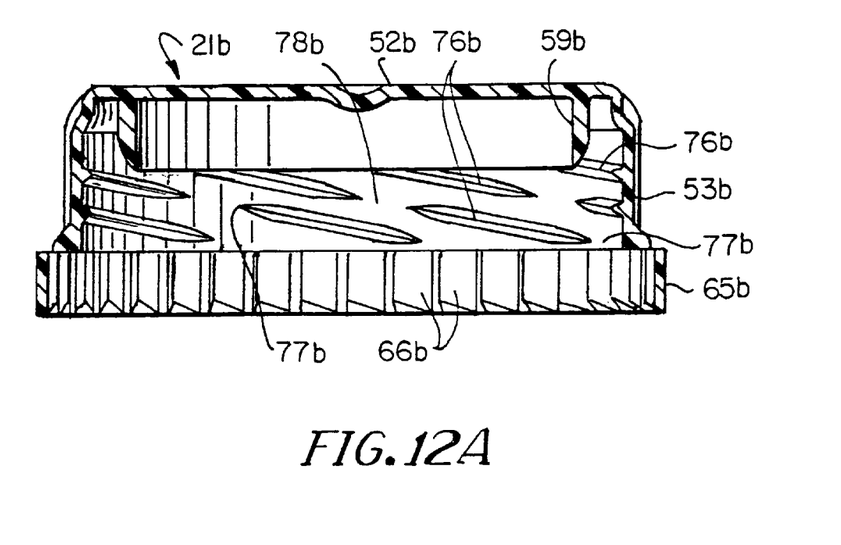
FIG. 12A is a view similar to FIG.7 of the modification of FIG. 12.
Figure 13:
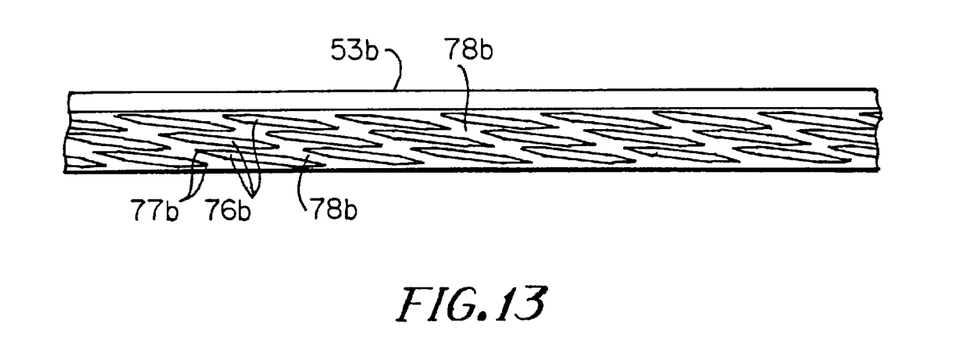
FIG. 13 is a view similar to FIG. 10 of the modification of FIGS. 12 and 12A.

In FIGS. 12–13, the segments 76b are staggered. There is a full thread start every 45°. Each lead has an effective length of approximately 148° with 3 segments 76 bead per lead. Again, there are 16 threads per inch and 8 leads. Gaps 77b are staggered, as shown.

It will be understood that the number and the spacing of the threads, segments and gap and their precise configuration are subject to modification.

An additional modification of the invention is shown in FIG. 12. Instead of the vertically positioned tear tab 74 shown in FIG. 7, a horizontal pull tab is employed. Such a tear tab is illustrated and described in U.S. Pat. No. 5,480,045 and is not described in detail herein. It will be understood that in removing the tamper evident band 65b, the user grips the tear strip and 81 pulls the same away from the tear band 65b and by continued pulling, separates the tear strip 65b from the skirt 53b, all as is well understood in this art. The type of tear strip 81 shown in FIG. 12 may be used in any of the preceding as well as in the following modification of the invention.

Referring now to the modification of FIGS. 14–17, a neck finish for use with PET bottles (which are injection molded) is shown. Although the threads 29c shown in FIG. 5 resemble the threads 29 of FIG. 1, it will be understood that the interrupted threads shown in FIGS. 9–13A may be substituted. The lip 14c maybe formed with an internal chamfer 86 to facilitate insertion of the cap plug if such a plug is employed. Below lip 14c is an external groove 87 and below the groove 87 are the external threads 29c. Such threads may be interrupted, as in FIGS. 9–13. The lower edge of the cap tamper evident band (not shown in FIGS. 14–16) may rest upon supporting ring 89. Ratchet teeth 88 (hereinafter described in detail) extend outward of locking wall portion 35c.

Figure 14:
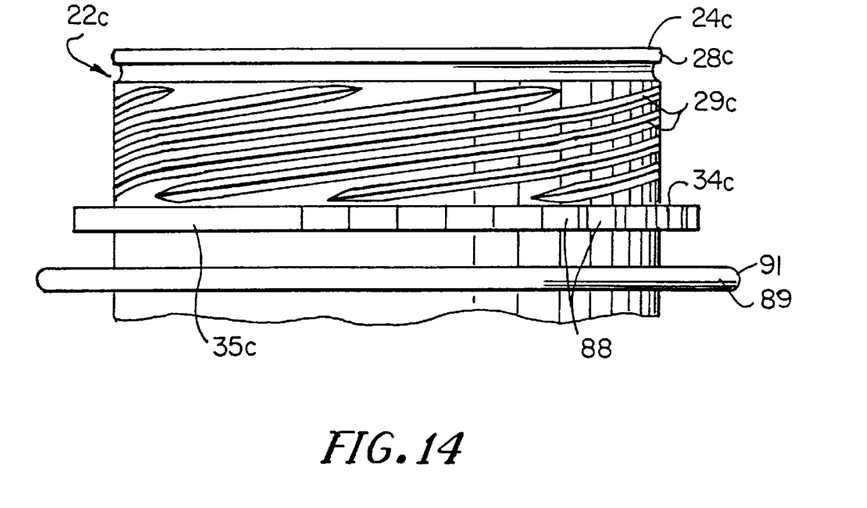
FIG. 14 is a view similar to FIG. 1 of a modified neck finish.
Figure 15:
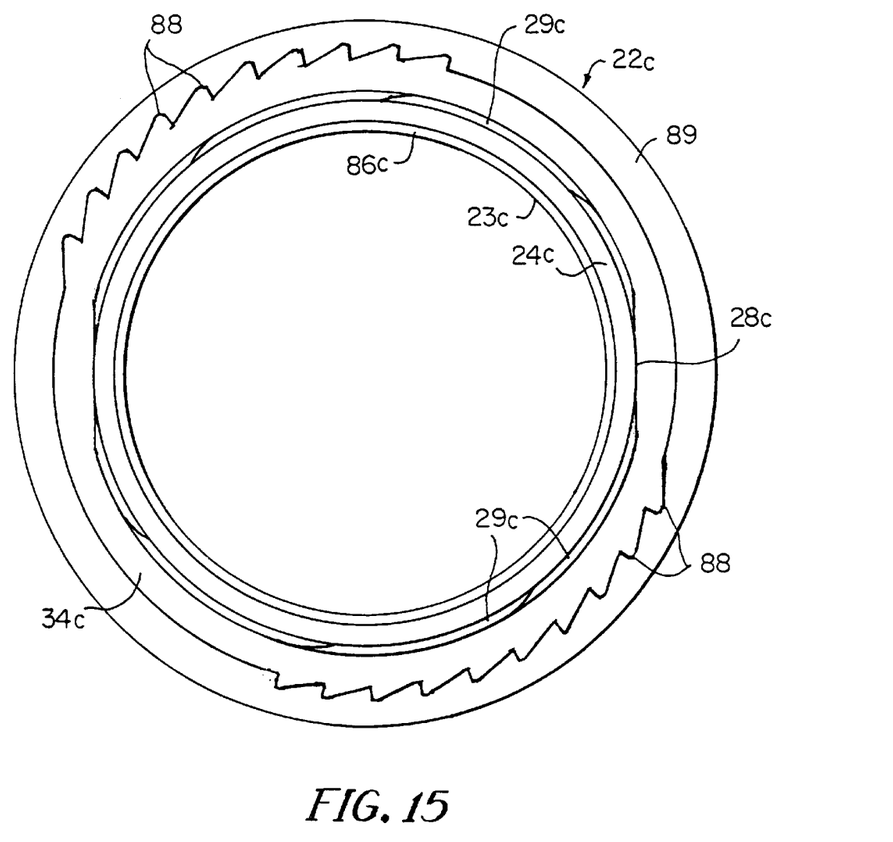
FIG. 15 is a view similar to FIG. 2 of the modification of FIG. 14.
Figure 16:
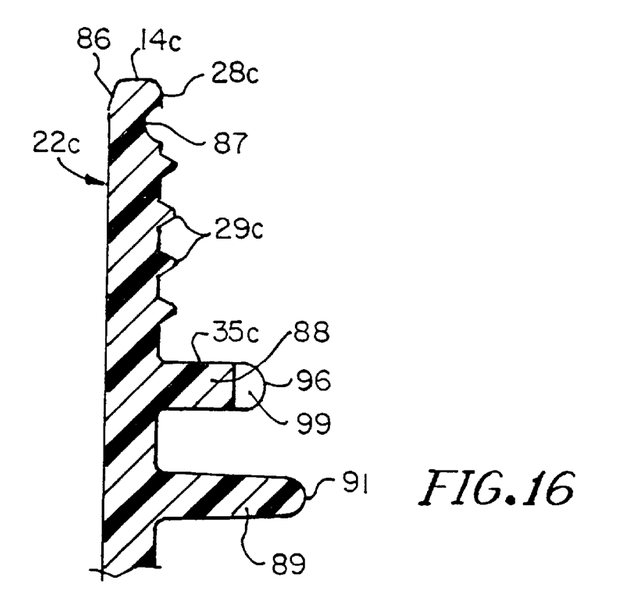
FIG. 16 is a view similar to FIG. 3 of the modification of FIG. 14.

Below locking wall portion 35c is neck support ring 89, used in handling the container both before and after filling. The outer edge of ring 89 is rounded as shown by reference numeral 91. The radius of curvature of edge 91 is approximately one half of thickness of the ring 89. The radius of said edge 91 is substantially greater than the radius of ratchet teeth 88.

Figure 17:
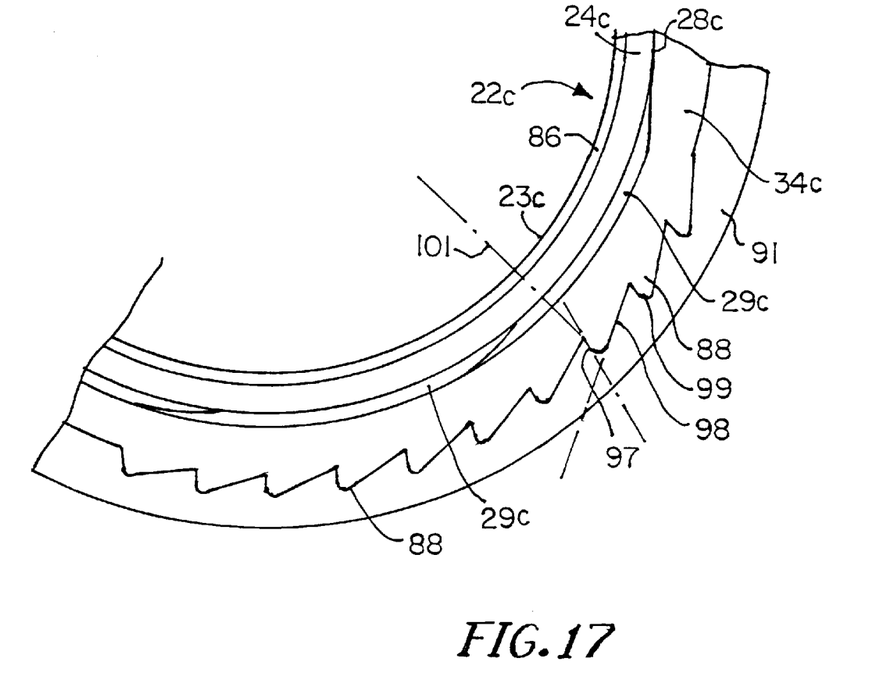
FIG. 17 is an enlarged plan view of a portion of a ratchet tooth in accordance with the modification of FIGS. 14–16.

Directing attention to FIGS. 16 and 17, as shown, the contour of the outer edge 96 of each tooth 88 is rounded. The radius of curvature of outer edge 96 is approximately one half the thickness of tooth 88. As best shown in FIG. 17, each tooth 88 has a working or mating flank 97 which bears against the corresponding flank of the ratchet teeth on the tamper evident band and a slanted flank 98 at an angle thereto. Flank 97 is at an angle relative to a radius 101 drawn to the theoretical point of the tooth 88 of approximately 10°. As viewed in plan in FIG. 17, there is a curvature 99 tangent to flanks 97 and 98. This curvature prevents a user being injured with what would otherwise be a sharp point. Curvature 99 as well as the rounded edge 96 prevents a user from being cut or otherwise injured by the point of the ratchet tooth 88.

In other respects the modifications of FIGS. 9–11 and FIGS. 12–13 and FIGS. 14–17, resemble those of the preceding modifications and the same reference numerals followed by the subscripts a, b, and c, respectively, represent corresponding elements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A container closure for use with a container neck having an external vertical stretch, a plurality of first helical threads on said vertical stretch, a locking wall below said vertical stretch, at least one first tooth on said locking wall, said closure comprising a top skirt depending from said top, said top skirt having an interior, a plurality of second helical threads on said interior of said skirt equal in number to said first helical threads, a tamper-evidencing band below said skirt, frangible means joining said band and said skirt, at least one second tooth on said band shaped to engage said at least one first tooth to prevent unscrewing of said closure in a first rotational direction relative to said neck without breaking said frangible means, said second threads being interrupted to form thread segments separated by gaps, said segments having tapered ends, each said segment having a leading end and a trailing end, each said end extending substantially 10° of the circumference of said skirt, each said segment comprising substantially 30° of full thread depth, each said segment having ends tapered to a point.

2. A closure according to claim 1 in which each said second thread has four said segments and three said gaps.

3. A closure according to claim 1 in which said gaps of each of said second threads are vertically aligned and there are four said segments on each side of each said gap.

4. A closure according to claim 3 in which said second threads are formed with a vertical space in which there are no threads on said interior of said skirt whereby a depending tab in a foil seal on said neck may be positioned between said external vertical stretch and said interior of said skirt within said vertical space.

5. A closure according to claim 1 in which said gaps of said second threads are staggered so that said segments overlap relative to a vertical line drawn on said skirt.

6. A closure according to claim 5 in which there are three said segments for each said second thread and each said thread has an effective length of substantially 148°.

* * * * *